(No Model.)
E. S. MATTHEWS.
HYDRAULIC VALVE.
No. 465,611.  Patented Dec. 22, 1891.
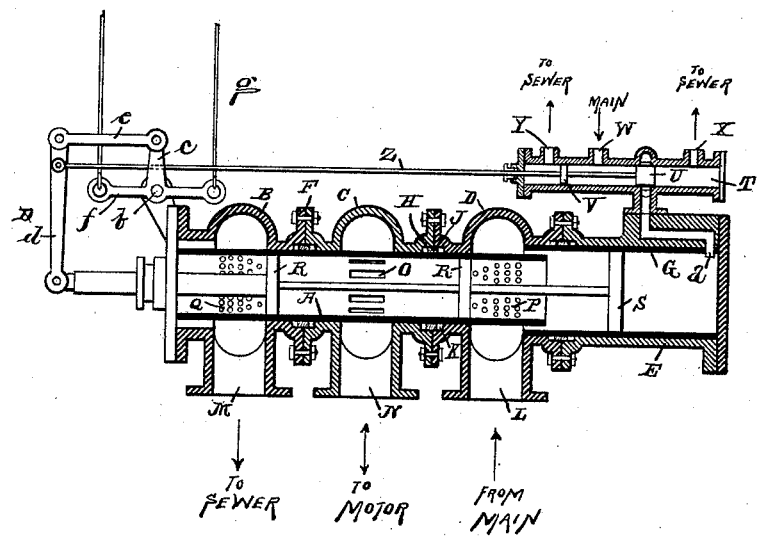
Witnesses:
P. P. Sheehan
Jessie Barnet
Edwin S. Matthews
Inventor
by James W. See
Attorney

UNITED STATES PATENT OFFICE.

EDWIN S. MATTHEWS, OF CINCINNATI, OHIO, ASSIGNOR OF ONE-HALF TO JAMES L. HAVEN, OF SAME PLACE.

HYDRAULIC VALVE.

SPECIFICATION forming part of Letters Patent No. 465,611, dated December 22, 1891.

Original application filed January 7, 1891, Serial No. 376,948. Divided and this application filed July 1, 1891. Serial No. 398,116.

(No model.)

*To all whom it may concern:*

Be it known that I, EDWIN S. MATTHEWS, of Cincinnati, Hamilton county, Ohio, have invented certain new and useful Improvements in Hydraulic Valves, of which the following is a specification.

This is a division of an application filed by me January 7, 1891, Serial No. 376,948.

This invention pertains to improvements in valves designed for use in controlling the flow of water to and from motors or machines operated by water under pressure—as, for instance, hydraulic elevators.

My present improvements will be readily understood from the following description, taken in connection with the accompanying drawing, which is a vertical longitudinal section of a valve exemplifying my invention.

In the drawing, A indicates a lining-tube forming the seat for the main valve; B, a valve-case section encircling the same; C, a second section: D, a third section; E, a fourth section forming an actuating-cylinder for the main valve, the four sections abutting endwise in a common line; F, flanges formed on the abutting ends of the several sections, these flanges being drawn together by bolts, there being an independent set of bolts at each pair of flanges; G, a lining-tube for the actuating-cylinder; H, a cylindrical counterbore in each of the flanges F; J, a ring in each of the counterbore recesses, the exterior of these rings fitting the counterbores neatly, while the interior of the rings fit the lining-tubes neatly; K, compressible packing in each of the counterbores to each side of the rings; L, a pipe connection on the valve-casing to communicate with the water-main or other source of supply of water under pressure; M, a similar pipe connection to communicate with the sewer or point of discharge for the water after it has done duty in the motor; N, a similar pipe connection to communicate with the motor which the valve is to control; O, passages placing pipe connection N always in connection with the interior of the main valve-seat; P, ports in the valve-seat placing the interior of the seat in connection with pipe connection L, the ports having effective areas decreasing toward the passages O; Q, similar ports at the pipe connection M, the effective area of the ports P and Q therefrom decreasing toward each other and toward the intermediately-disposed passages O; R, a double piston-valve working within the valve-seat, the distance between the pistons being less than the distance between the two sets of ports P and Q; S, a piston working in the actuating-cylinder and connected with the valve R; T, the valve-casing of the pilot-valve; U, the pilot-valve working therein; V, a counterbalancing-piston on the pilot-valve; W, a pipe connection from the water-main to the pilot-valve casing at one side of the pilot-valve; X, a pipe connection from the other side of the pilot-valve to the sewer; Y, a pipe connection from the sewer to the other side of the counterbalancing-piston V; Z, the stem of the pilot-valve; *a*, a port leading from behind the actuating-piston S to the pilot-valve casing between the pipe connections W and X; *b*, a pivot; *c*, an arm mounted thereon and carrying a pivot on its upper end; *d*, a lever pivoted at its lower end to the stem of the main valve R; *e*, a link pivoted at one end to the upper end of that lever and at the other end to the arm *c*; *f*, arms connected with the arm *c*, and *g* connections, as ropes, attached to the arms *f* and serving as means by which the arm *c* may be rocked from a point at a distance— as, for instance, when the ropes *g* go, as usual, to the car of a hydraulic elevator.

When the parts are in the normal position shown in the drawing, the main valve is closed and water cannot pass either to or from the motor, and port *a* is closed by the pilot-valve, so that the pressure on the left of the piston S cannot move the main valve. The pressure from W on the pilot-valve is in both directions. Hence the pilot-valve has no self-moving tendency. The stem of the pilot-valve is connected to the lever *d*. Therefore if arm *c* be moved to the left and fixed in its new position the pilot-valve will be moved to the left and pressure will be relieved on the right of piston S, and the pressure on the left of that piston will move the piston and main valve to the right, thus permitting water to flow to the motor; but when the main valve begins its movement to the right it begins to move the lever $d$, its top pivot forming the fulcrum, and to push the pilot-valve to closed position, which, when reached, will result in all the parts coming to rest. Therefore the degree of opening of the main valve is controlled by the position of setting of the pilot-valve. The effect when the pilot-valve is moved to the right will be obvious. The passages O are always open and the inner faces of the pistons R are always at motor-pressure. The ports P and Q increase in effective area outwardly. Hence the flow of water to or from the motor will be initiated gradually.

A leaky pilot-valve is in ordinary constructions a source of danger and annoyance, the water under pressure going to the actuating-piston and causing a creeping motion of the main valve, and perhaps a full-speed motion, thus starting the motor when the pilot-valve is set in closed position; but in my construction the lap of the main valve is greater in proportion to its movement than the lap of the pilot-valve in proportion to the movement of the pilot-valve. Hence if the main valve moves under the effect of leakage past the pilot-valve the first effect will be idle travel of the main valve over its lap. Before this idle travel is exhausted, so as to open a main port, the pilot-valve will have been moved over its entire lap and will have opened a port to produce an effect the opposite of that initiated by the leakage.

In practice with my system I find that a leaky pilot-valve is not an element of danger or annoyance further than as measured by waste of water, while the leakage of pilot-valves in ordinary construction is a very serious matter. The particular constructions shown are merely exemplifying in character so far as this feature is concerned, and may be greatly varied.

The sections of the valve-casing are secured together by the bolts in the flanges F, and any particular section may be turned on its axis without disturbing the other sections to bring its pipe connection in the desired direction, and as the rotary adjustment is being made the lining-tube, on which the sections neatly fit, acts as a fixed pivot. The joints at the flanges are made tight by the compressible packing R, and when the joints are unbolted for adjustment the rings J prevent the packings from becoming caught in the joint-cracks, so as to interfere with the flanges being properly drawn together.

I claim as my invention—

1. In a hydraulic valve, the combination, substantially as set forth, of a valve-seat having independent supply and discharge ports whose effective areas gradually increase outwardly in opposite directions, a passage to the seat between said ports and always open to the controlled motor, and a double valve reciprocating within said seat over said graduated ports and placing them alternately in communication with said intermediate passage.

2. In a hydraulic valve, the combination, substantially as set forth, of a valve-casing having independent supply and discharge ports, a double piston in such casing, the distance between the pistons being less than the distance between said ports, a passage leading from between said ports and between said pistons to the motor to be controlled, said pistons being adapted to place said intermediate passage in communication with said ports alternately but not coincidently.

3. In a hydraulic valve, the combination, substantially as set forth, of a main valve having lap, a pilot-valve casing, a pilot-valve movable in said casing and having less lap in proportion to its travel than the main valve, and connection between the two valves to cause the pilot-valve to exhaust its lap before the main valve exhausts its lap.

4. In a hydraulic valve, the combination, substantially as set forth, of a valve-casing composed of a number of abutting sections, a lining-tube therefor, independent joint-bolts at each joint between sections, a counterbore at each side of each joint, elastic packings therein, and a ring at each joint between the two packings thereof.

5. In a hydraulic valve, the combination, substantially as set forth, of a valve-casing composed of a number of abutting counterbored flanged sections, a lining-tube fitting said sections, packings in said counterbores, and independent bolts at each joint between sections.

EDWIN S. MATTHEWS.

Witnesses:
W. L. CAVAN,
J. E. SCALLY.